United States Patent [19]
Miyano

[11] Patent Number: 5,911,803
[45] Date of Patent: Jun. 15, 1999

[54] SYSTEM AND METHOD FOR DELIVERING ELONGATE WORKPIECES TO A POINT OF USE

[76] Inventor: Toshiharu Tom Miyano, 50 Dundee La., Barrington Hills, Ill. 60010

[21] Appl. No.: 08/924,597

[22] Filed: Sep. 4, 1997

[51] Int. Cl.⁶ .............................. B23B 3/00; B23B 13/00; B23B 17/00
[52] U.S. Cl. .................. 82/1.11; 82/124; 82/125; 82/126; 82/127; 414/18; 414/751
[58] Field of Search ............................. 82/1.11, 124, 125, 82/126, 127; 414/15, 17, 18, 680, 751

[56] References Cited

U.S. PATENT DOCUMENTS

| | | | |
|---|---|---|---|
| 3,400,837 | 9/1968 | Dalik | 414/18 |
| 3,469,295 | 9/1969 | De Gain | 82/125 |
| 3,707,101 | 12/1972 | Werth | 82/125 |
| 4,317,394 | 3/1982 | Link et al. | 82/125 |
| 4,388,039 | 6/1983 | Schwarze | 82/125 |
| 4,671,784 | 6/1987 | Duck | 82/125 |
| 5,366,334 | 11/1994 | Cucchi | 82/126 |
| 5,451,132 | 9/1995 | Tokiwa | 414/751 |

*Primary Examiner*—Andrea L. Pitts
*Assistant Examiner*—Toan Le
*Attorney, Agent, or Firm*—Wood, Phillips, Van Santen, Clark & Mortimer

[57] ABSTRACT

A system for delivering elongate workpieces to a point of use. The delivering system has a first storage unit for a supply of a first type of elongate workpiece, a second storage unit for a supply of a second type of elongate workpiece, a pickup unit for selectively picking up elongate workpieces one-by-one from the first and second storage units, and a guide system for guidingly moving the pickup unit with a workpiece picked up thereby to a predetermined transfer location.

22 Claims, 4 Drawing Sheets

SYSTEM AND METHOD FOR DELIVERING ELONGATE WORKPIECES TO A POINT OF USE

BACKGROUND OF THE INVENTION

1. Field of the Invention

This invention relates to workpiece handling systems and, more particularly, to a system for handling elongate workpieces and a method of using such a system.

2. Background Art

It is known to automatically deliver elongate workpieces to a tool which performs a processing operation on the workpiece. It is known, for example, to automatically deliver elongate workpieces to a turning lathe. Typically, these delivery systems are designed to handle a single configuration workpiece. In the event that a workpiece having a configuration not compatible with the delivery system is to be processed by the tool, it is generally necessary to either manually control the workpiece or provide a second delivery system to work in conjunction with the first described delivery system.

It is desirable to design such automated delivery systems to be constructed economically and to allow them to operate quickly with minimal operator intervention and inconvenience.

SUMMARY OF THE INVENTION

In one form of the invention, a system is provided for delivering elongate workpieces to a point of use. The delivering system has a first storage unit for a supply of a first type of elongate workpiece, a second storage unit for a supply of a second type of elongate workpiece, a pickup unit for selectively picking up elongate workpieces one-by-one from the first and second storage units, and a guide system for guidingly moving the pickup unit with a workpiece picked up thereby to a predetermined transfer location.

The first storage unit may have an inclined surface for guiding workpieces moving under gravitational forces towards a ready position from which a workpiece can be transferred to the pickup unit.

The first storage unit may further have a blocking element against which a workpiece moving downwardly on the inclined surface abuts and a lift for selectively directing a workpiece abutted to the blocking element upwardly to allow movement of the working element past the blocking element to the ready position.

The first storage unit may include a gate element that is placeable selectively in a) an extended position wherein the gate element blocks a workpiece in the ready position; and b) a release position wherein the workpiece in the ready position is allowed to move to the pickup unit.

The pickup unit may include at least one carrier with a receptacle for a workpiece, with the carrier being movable through a guide system between a) a pickup position wherein a workpiece can be transferred from the first storage unit to the carrier receptacle and b) a delivery position at the transfer location.

The guide system may include a member that moves around a pair of spaced pulleys in an endless path, with the carrier being attached to the member to follow movement of the member to thereby move between the pickup and delivery positions.

The delivery system may be provided in combination with a tool for performing a processing step on a workpiece. A workpiece mounting system may be provided for conveying a workpiece from the transfer location into an operative state on the tool.

First and second tools can be provided for performing separate processing steps on a workpiece. The workpiece mounting system can convey a workpiece from the transfer location into an operative state selectively on either of the first and second tools.

The mounting system may include a seat member for supporting a workpiece and a transfer system for moving a workpiece at the transfer location to a supported position on the seat member.

The transfer system may include a surface that is inclined downwardly from the transfer location towards the seat member to cause a workpiece to be guided under its own weight in movement between the transfer location and the seat member.

The transfer system may be repositionable between first and second states. With the transfer system in the first state, the surface is inclined downwardly from the transfer location toward the seat member. With the transfer system in the second state, the surface is inclined downwardly from the seat member towards the pickup unit.

The carrier is movable between a return position and a reloading position. In the return position, the carrier is located to receive in the receptacle thereon a workpiece moving from the seat member guidingly along the surface with the conveyor system in the second state. The carrier in the reloading position is situated adjacent to the first storage unit to permit transfer of a workpiece in the receptacle on the carrier to the first storage unit.

A repositioning element may be provided for selectively directing a workpiece from the carrier receptacle, with the carrier in the reloading position, to the first storage unit.

A reorienting element can be provided for selectively changing the orientation of the seat member from a first position wherein a workpiece is supportable on the seat member and a second position wherein a workpiece on the seat member moves under its own weight away from the seat member.

A discard receptacle can be provided for accepting a workpiece from the seat member as an incident of the seat member moving from its first position into its second position.

In one form, the workpiece mounting system includes an elongate arm carrying the seat member. The elongate arm is pivotable between first and second positions. At least one shifting assembly is provided. With the seat member adjacent to the first tool with the elongate arm in the first position, the shifting assembly can be operated to reposition a workpiece on the seat member into the operative state on the first tool.

The invention contemplates the above system in combination with a supply of a first type of workpiece in the first storage unit and a supply of a second type of workpiece in the second storage unit. The first and second types of workpieces can be different.

The invention also contemplates a method of manipulating elongate workpieces including the steps of providing a first supply of a first type of elongate workpiece at a first location, providing a second supply of a second type of elongate workpiece at a second location, providing a pickup unit, moving the pickup unit to a first pickup position, transferring a first workpiece from the first supply to a carrying position on the pickup unit, guidingly moving the pickup unit and first workpiece to a delivery position, transferring the first workpiece in the carrying position away from the pickup unit in the delivery position to a first point of use, guidingly moving the pickup unit to a second pickup position, transferring a second workpiece from the second supply to a carrying position on the pickup unit, guidingly moving the pickup unit and second workpiece to a second delivery position, and transferring the second workpiece in the carrying position away from the pickup unit at the second delivery position to a second point of use.

The method may further include the steps of guidingly moving the pickup unit to a return position, transferring at least part of the first workpiece from the first point of use into the carrying position on the pickup unit in the return position, guidingly moving the pickup unit and the at least part of the first workpiece to a reloading position, and transferring the at least part of the first workpiece from the pickup unit in the reloading position to the first supply of elongate workpieces.

The method may further include the step of providing a first tool for performing a processing step on an elongate workpiece. The step of transferring the first workpiece may involve transferring the first workpiece to a mounting system. The method may further include the step of placing the first workpiece through the mounting system into an operative state on the first tool.

The method may further include the steps of performing a processing step on the first workpiece with the first tool including removing a portion of the first elongate workpiece and with the mounting system transferring the removed portion of the first elongate workpiece to a discard location.

The method may further include the step of providing a second tool for performing a processing step on an elongate workpiece. The step of transferring the second workpiece may involve transferring the second workpiece to the mounting system. The method may further include the step of placing the second workpiece through the mounting system into an operative state on the second tool.

DETAILED DESCRIPTION OF THE DRAWINGS

Figure 1:
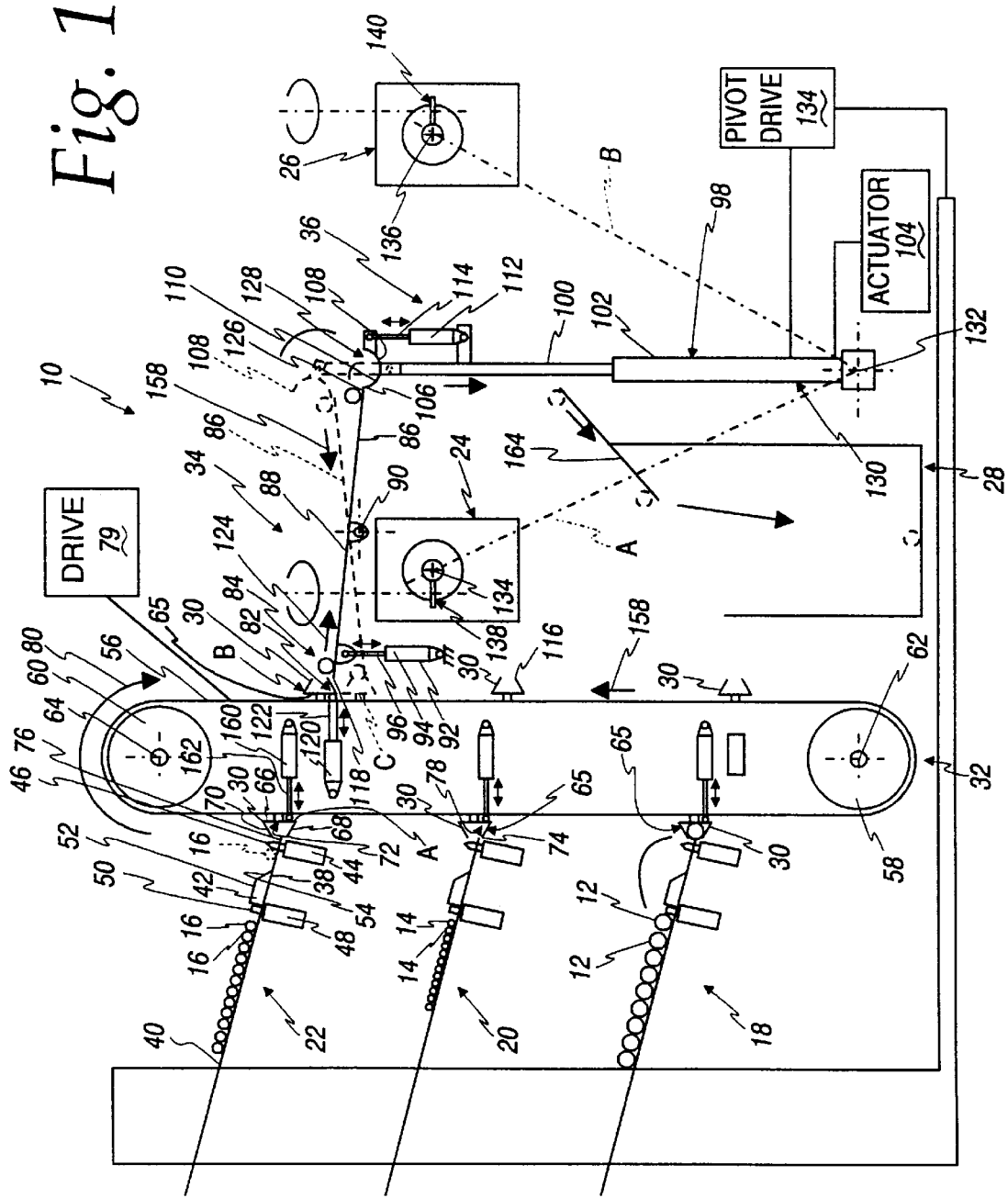
FIG. 1 is a side elevation view of a system for delivering elongate workpieces to a point of use according to the present invention.
Figure 2:
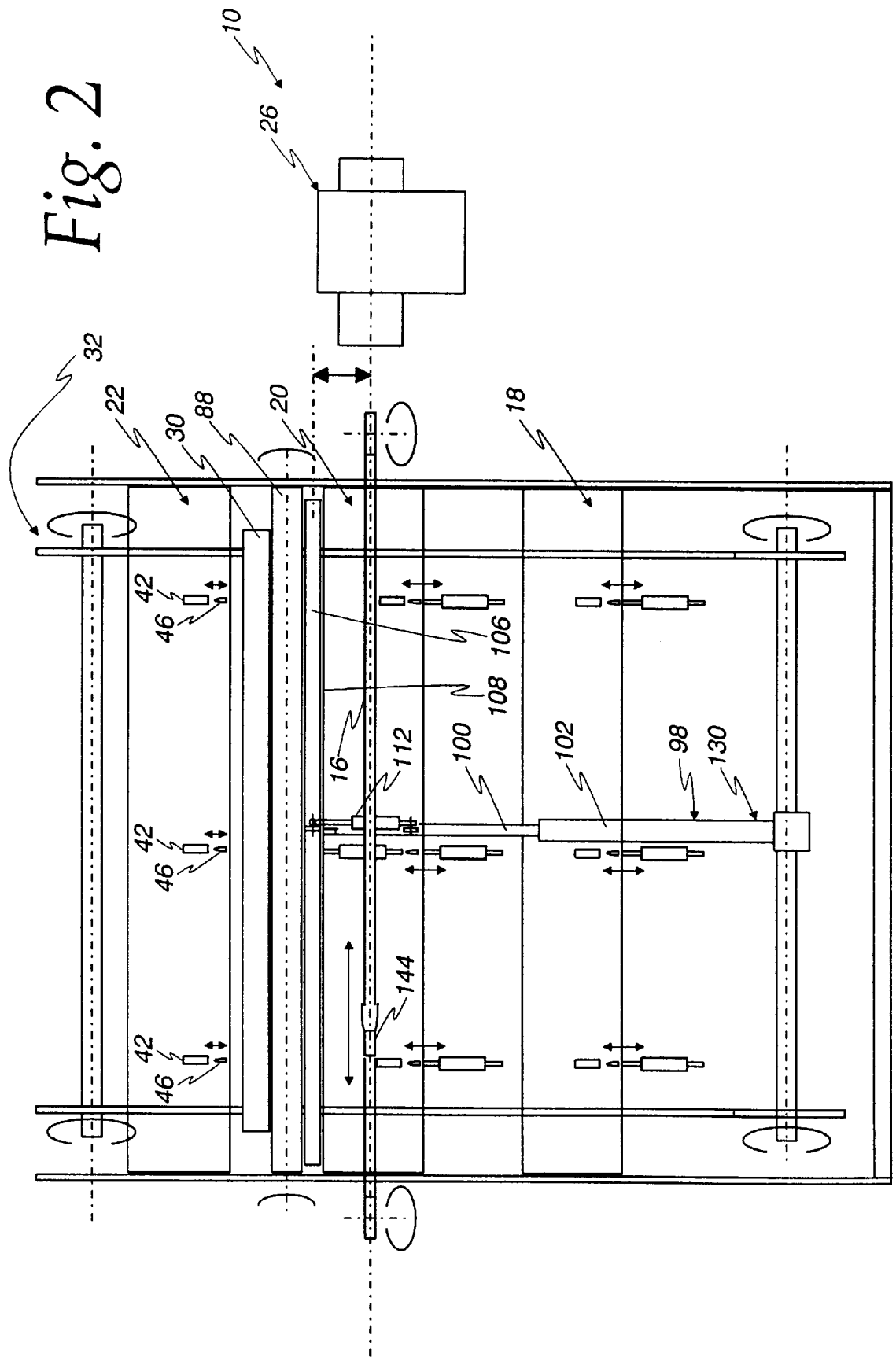
FIG. 2 is a front elevation view of the inventive workpiece delivering system of FIG. 1.

In FIGS. 1–4, an automated system for delivering elongate workpieces, according to the present invention, is shown at 10. The system 10 is designed to deliver elongate workpieces 12, 14, 16 from first, second, and third storage units 18, 20, 22, one-by-one for processing selectively to first and second different machine tools 24, 26. The machine tools 24, 26 perform any of a number of different conventional processing steps on the workpieces 12, 14, 16. During the processing step, a part of the workpiece 12, 14, 16 may remain unused. Through the inventive system 10, the remaining workpiece part is either discarded into a receptacle 28 or returned to the appropriate storage unit 18, 20, 22.

The above handling operation is carried out through the coordinated operation of various subsystems. The workpieces 12, 14, 16 are moved from the storage units 18, 20, 22 through pickup units 30. The pickup units 30 are controllably moved through a guide system 32 in a predetermined path from the storage units 18, 20, 22 to a transfer system 34. Workpieces 12, 14, 16 are delivered through the transfer system 34 to a workpiece mounting system 36, which a) positions workpieces 12, 14, 16 carried thereby selectively at the first and second tools 24, 26, b) places the workpieces 12, 14, 16 in an operative state on the tools 24, 26, and c) moves any unused portion of the workpiece 12, 14, 16 after the processing step either to the discharge receptacle 28 or to the guide system 32 for restocking on the storage units 18, 20, 22. The individual subsystems will now be described in greater detail, below.

STORAGE UNITS 18, 20, 22

The three storage units 18, 20, 22 each have the same general construction. Thus, the discussion herein will be limited to exemplary storage unit 22. It should be understood that any number of storage units is contemplated by the invention, i.e. one or greater than three.

The storage unit 22 consists of a workpiece support member 38 having a flat, upwardly facing surface 40 that is inclined downwardly towards the guide system 32. The workpieces 16 are stored side-to-side, as shown in the figures, with the inclination of the surface 40 being such that the workpieces 16 move under their own weight downwardly towards the guide system 32. Spaced blocking elements 42 abut to the lowermost workpiece 16 to prevent uncontrolled passage of the workpieces 16 to against the guide system 32.

Downstream of the blocking elements 42, repositionable gate elements 44 are provided. Each gate element 44 has a rod 46 that is repositionable between a retracted position, wherein the rod 46 does not project above the surface 40, and an extended position, shown in FIG. 1, wherein the workpiece 16 is consistently blocked thereby in a ready position, as shown in phantom lines in FIG. 1.

To place the workpieces 16 abutted to the blocking elements 42 one-by-one into the ready position, a plurality of lifts 48 are provided immediately upstream of the blocking elements 42. The lifts 48 each have a rod 50 which is extendable from beneath a workpiece 16 abutted to the blocking element 42 to a position wherein the workpiece 16 is elevated by the rod 50 to the height of the upper surface 52 of each blocking element 42. As this occurs, the element 16 slides down the surface 52 and is from there guided by an angled surface 54 to against the surface 40 until the workpiece 16 abuts to the gate element 44 to be in the ready position. By then retracting the rod 46, the workpiece 16 is released for reception by the pickup units 30.

GUIDE SYSTEM 32

The guide system 32 carries a plurality of the pickup units 30. Each pickup unit 30 is mounted on endless belt members 56 which are trained around spaced pulleys 58, 60, which rotate around parallel axes 62, 64, respectively. Through this arrangement, the pickup units 30 are caused to move in an endless path around the pulleys 58, 60.

The pickup units 30 have a length aligned to be parallel with the pulley axes 62, 64 and the lengths of the workpieces 12, 14, 16 situated in the storage units 18, 20, 22. In cross section, each pickup unit 30 includes a carrier 65 that is U-shaped, with a base 66 and legs 68, 70 projecting away from the base 66 and converging slightly away from the base 66. The base 66 and legs 68, 70 cooperatively define a receptacle 72 for the workpieces 12, 14, 16.

To pick up a workpiece 16, the endless belts 56 are operated to situate the pickup unit 30 at A so that the free end 74 of the leg 68 is immediately at the level of, or slightly beneath, the bottom free end 76 of the surface 40. By then operating the gate element 44 to retract the rod 46, the workpiece 16 in the ready position slides under its own weight into a carrying position in the receptacle 72. In the carrying position, the workpiece 16 is wedged into a V-shaped portion 78 of the receptacle 72 defined cooperatively by the base 66 and leg 68.

The endless element 56 is then advanced, by operating a drive 79, in the direction of the arrow 80. The carrier 30 with the workpiece 16 therein moves upwardly until it reaches the top of the pulley 60 and then reverses direction. As this occurs, the workpiece 16 shifts from the V-shaped seat portion 78 into a V-shaped seat portion 82 defined cooperatively by the base 66 and leg 70. The belts 56 are advanced to move the carrier downwardly until the pickup unit 30 reaches a delivery position as shown at B in FIG. 1 at a transfer location 84.

TRANSFER SYSTEM 34

The transfer system consists of a pivotable member 86 with a flat, upwardly facing surface 88. The member 86 is mounted for pivoting movement about an axis 90 that is parallel to the pulley axes 62, 64. Through a pivot drive 92, the element 88 is pivotable between a first state, as shown in solid lines in FIG. 1, and a second state, shown in phantom lines in FIG. 1. In the first state, the surface 88 declines from the guide system 32 towards the mounting system 36, whereas in the second state, the surface 88 declines from the mounting system 36 towards the guide system 32, for reasons that will be explained below.

The pivot drive 92 consists of a cylinder 94 which operates an extendable ram 96 connected to the element 86. Extension of the ram 96 moves the element 86 from its second state into its first state.

MOUNTING SYSTEM 36

The mounting system 36 consists of a vertically extending, elongate arm 98. The arm 98 has arm sections 100, 102 that are telescopingly mated, one within the other, to allow selective length adjustment. The relative positions of the arm sections 100, 102 can be set by a conventional actuator 104.

The upper end of the arm 98 carries a seat member 106. The seat member 106 has a body 108 defining an upwardly opening, U-shaped seating surface 110 for a workpiece. The body 108 is pivotable relative to the arm section 100 between the solid line position in FIG. 1 and the phantom line position in that same figure. A reorienting element 112, in the form of a cylinder, has a repositionable ram 114 that is extendable to move the body 108 from the solid line position to the phantom line position in FIG. 1.

With the workpiece 16 and the pickup unit 30 at the transfer location 84 and the transfer system 34 in the first state, the free end 116 of the pickup unit leg 70 resides at the height of, or slightly above, one free end 118 of the surface 88. By operating a plurality of repositioning elements 120, extendable rods 122 thereon push the workpiece 16 out of the receptacle 72 and onto the surface 88. The workpiece 16 then slides under its own weight in the direction of the arrow 124 to the opposite end 126 of the surface 88. The arm sections 100, 102 are relatively positioned so that with the body of the seat member 106 in the solid line position of FIG. 1, the workpiece 16 can slide off of the surface end 126 into the receptacle 128 defined by the seating surface 110.

The bottom end 130 of the arm 98 is pivoted for movement around an axis 132 that is parallel to the pulley axes 62, 64. Through a pivot drive 134, the arm can be pivoted between the dotted line A and B positions shown in FIG. 1. As this pivoting occurs, the reorienting element 112 can be operated to maintain the body 108 of the seat member 106 substantially in the upright, solid position of FIG. 1.

By operating the drive 104 to pivot the arm 98 to the A position, the axis of the workpiece 16 aligns to be substantially parallel to the operating axis 134 for the tool 24. Similarly, positioning of the arm 98 in the B position causes the axis of the workpiece 16 to align with the operating axis 136 for the tool 26.

There are separate shifting assemblies 138, 140 associated one each with the tools 24, 26, respectively. Each operates in the same manner. Exemplary shifting assembly 136 has an endless belt 142 carrying a releasable gripper 144. The belt 142 is trained around spaced pulleys 146, 148 which rotate around parallel axes 150, 152, which are orthogonal to the tool axis 136. By operating a drive 154, the gripper 144 is movable with the belt 142 in the direction of the double-headed arrow 156, i.e. parallel to the tool axis 136.

Figure 3:
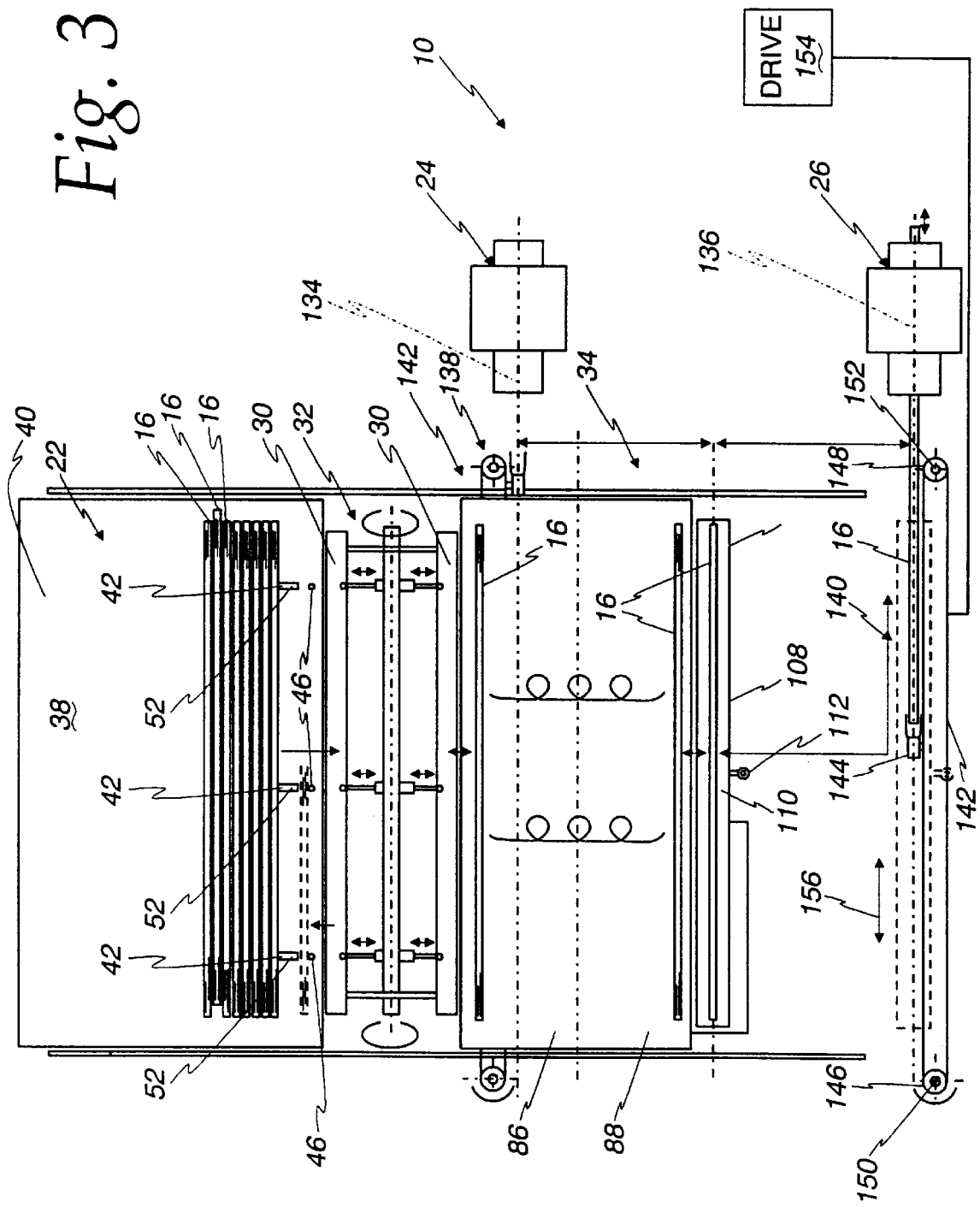
FIG. 3 is a plan view of the inventive workpiece delivering system of FIGS. 1 and 2.
Figure 4:
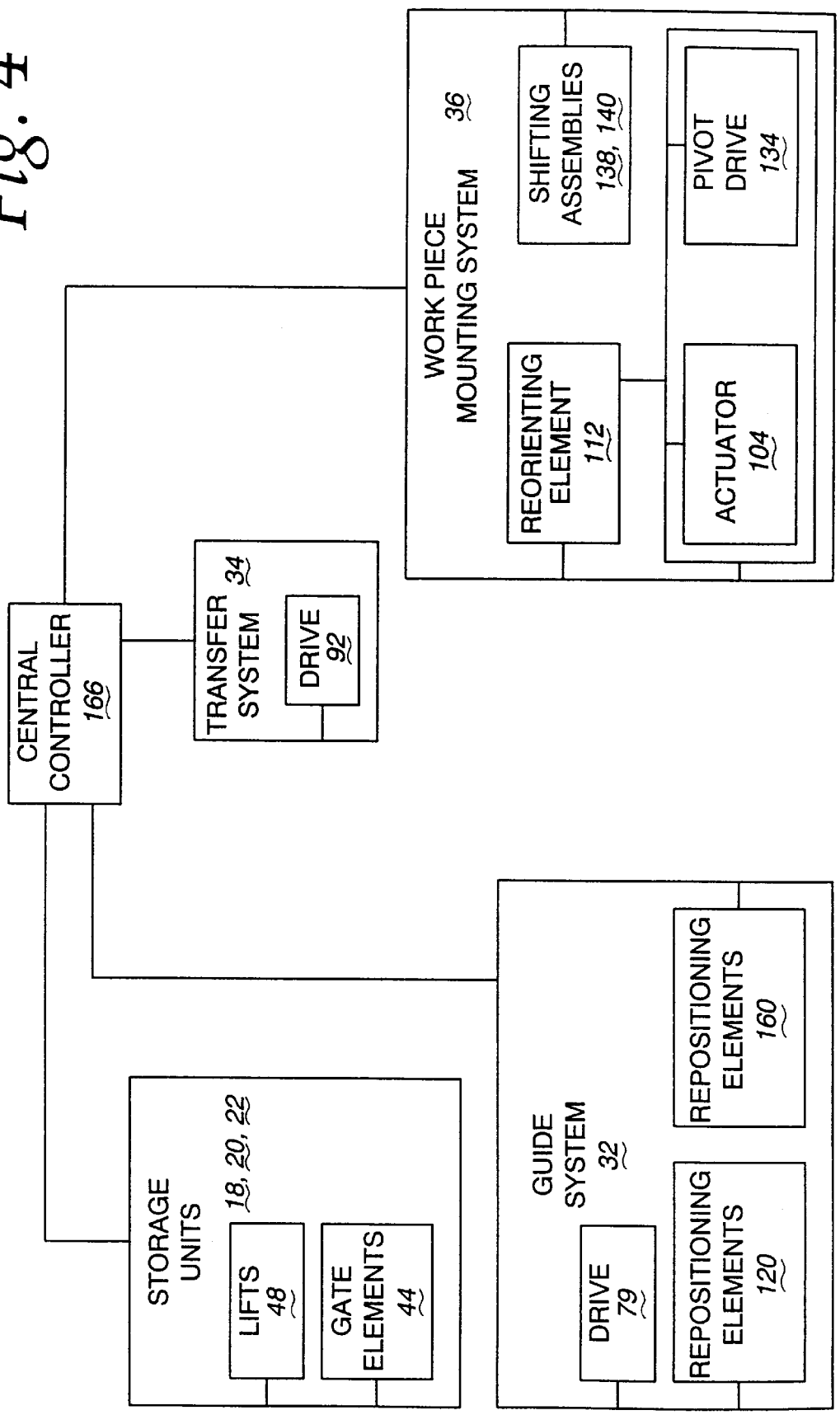
FIG. 4 is a schematic representation of the inventive workpiece delivering system in FIGS. 1–3.

With the arm 98 in the B position of FIG. 1, the drive 154 can be operated to advance the workpiece 16 into the operating state on the tool 26, shown in FIG. 3. By then retracting the gripper 144 through operation of the drive 154, and repositioning the arm 98, a desired processing step can be carried out without interference from the gripper 144.

In some operations, the workpiece 16 is cut so that there is a useable portion that is to be machined and a remaining unused portion. The arm 98 can be repositioned so that the seating member 106 accepts the remaining, unused portion of the workpiece 16. The arm 104 can then be returned to the solid line position in FIG. 1. By placing the transfer system 34 in the second state, i.e. phantom line position, with the arm sections 100, 102 relatively in the phantom line position of FIG. 1, the body 108 can be repositioned, i.e. tipped, through the reorienting element 112 to cause the remaining portion of the workpiece 16 to move under its own weight in the direction of the arrow 158 along the surface 88 of the element 86 back towards the guide system 32.

To accept the remaining, unused portion of the workpiece 16, one of the pickup units 30 is moved to a return position, shown at C in phantom lines in FIG. 1. The remaining portion of the workpiece 16 then moves into the receptacle 72. By advancing the belt 56 reversely in the direction of the arrow 158, the pickup unit 30 with the remaining portion of the workpiece 16 can be situated in a reloading position, which in this case is the same as the pickup position, at the pickup unit 22. By operating the repositioning element 160, a ram 162 is extended to push the remaining portion of the workpiqce 16 out of the receptacle 72 and on to the surface 40 for re-storage on the first unit 22. The repositioning element 160 could move the remaining portion of the workpiece 16 to the ready position, previously described. Diverting structure could be incorporated to direct the remaining portion of the workpiece 16 to any location on the surface 40.

If the remaining portion of the workpiece 16 is determined to be unusable, it can be delivered to the discard receptacle 28 directly from the seating member 106 by tipping the body 108 through the reorienting element 112 with the body 108 of the seating member 106 residing beneath the element 86. An inclined deflecting element 164 is provided to intercept the falling portion of the workpiece element 16 and to guide it into the receptacle 28.

With the inventive system, the workpieces from any of the three storage units 18, 20, 22 can be delivered to either tool 24, 26 and in any order. The remaining portion of the workpieces 12, 14, 16 after processing can either be discarded or returned to the storage units 18, 20, 22. Accordingly, a single system can be used to deliver one-by-one any desired workpiece configuration to selected processing tools 24, 26. Through a central controller 166, a programmed, automatic operation of the system 10 can take place. Movement of the multiple pickup units 30 with the various coordinated subsystems can be effected through the controller 166 to produce an efficient overall operation. The specific design of the central controller 166 is within the knowledge of one skilled in this art.

The foregoing disclosure of specific embodiments is intended to be illustrative of the broad concepts comprehended by the invention.

I claim:

1. A system for delivering elongate workpieces to a point of use, said workpiece delivering system comprising:

a first storage unit for a supply of a first type of elongate workpiece;

a pickup unit for selectively picking up elongate workpieces one-by-one from the first storage unit; and a guide system for guidingly moving the pickup unit with a workpiece picked up thereby to a predetermined transfer location, wherein the first storage unit comprises a surface for guiding workpieces moving under the force of gravity toward a ready position from which a workpiece can be transferred to the pickup unit, wherein the guiding surface comprises an inclined surface and the first storage unit comprises a blocking element against which a workpiece moved downwardly along the guiding surface abuts, and a lift for selectively directing a workpiece abutted to the blocking element upwardly to allow movement thereof past the blocking element to the ready position.

2. The workpiece delivering system according to claim 1 in combination with a tool for performing a processing step on a workpiece, said workpiece delivering system further comprising a workpiece mounting system for conveying a workpiece from the transfer location into an operative state on the tool.

3. The workpiece delivering system according to claim 2 wherein the workpiece mounting system comprises a seat member for supporting a workpiece and a transfer system for moving a workpiece from the transfer location to a supported position on the seat member.

4. The workpiece delivering system according to claim 3 wherein the transfer system comprises a surface that is inclined downwardly from the transfer location toward the seat member to cause a workpiece to be guided under its own weight in movement between the transfer location and the seat member.

5. The workpiece delivering system according to claim 1 in combination with first and second tools for performing separate processing steps on a workpiece, said workpiece delivering system further comprising a workpiece mounting system for conveying a workpiece from the transfer location into an operative state selectively on one of the first and second tools.

6. The workpiece delivering system according to claim 1 further comprising a second storage unit for a second supply of elongate workpieces, the pickup unit being capable of selectively picking up elongate workpieces one-by-one from the first and second storaae units, in combination with a supply of a first type of workpiece in the first storage unit and a supply of a second type of workpiece in the second storage unit.

7. The workpiece delivering system according to claim 6 wherein the workpieces in the first supply of workpieces are different than the workpieces in the second supply of workpieces.

8. A system for delivering elongate workpieces to a point of use, said workpiece delivering system comprising:

a first storage unit for a supply of a first type of elongate workpiece;

a second storage unit for a supply of a second type of elongate workpiece;

a pickup unit for selectively picking up elongate workpieces one-by-one from the first and second storage units; and a guide system for guidingly moving the pickup unit with a workpiece picked up thereby to a predetermined transfer location, wherein the first storage unit comprises a surface for guiding workpieces moving under the force of gravity toward a ready position from which a workpiece can be transferred to the pickup unit, wherein the guiding surface comprises an inclined surface and the first storage unit comprises a blocking element against which a workpiece moved downwardly along the guiding surface abuts, and a lift for selectively directing a workpiece abutted to the blocking element upwardly to allow movement thereof past the blocking element to the ready position.

9. The workpiece delivering system according to claim 8 wherein the first storage unit comprises a gate element that is placeable selectively in a) an extended position wherein the gate element blocks a workpiece in the ready position and b) a release position wherein a workpiece in the ready position is allowed to move to the pickup unit.

10. The workpiece delivering system according to claim 9 wherein the pickup unit comprises at least one carrier with a receptacle for a workpiece and the guide system comprises a guide system for moving the one carrier between a) a pickup position wherein a workpiece can be transferred from the first storage unit to the carrier receptacle and b) a delivery position at the transfer location.

11. The workpiece delivering system according to claim 10 wherein the guide system comprises a member that moves around a pair of spaced pulleys in an endless path and the carrier is attached to the member to follow movement of the member to thereby move between the pickup and delivery positions.

12. In combination:

a) a system for delivering elongate workpieces to a point of use, said workpiece delivering system comprising:

a first storage unit for a supply of a first type of elongate workpiece;

a second storage unit for a supply of a second type of elongate workpiece;

a pickup unit for selectively picking up elongate workpieces one-by-one from the first and second storage units; and a guide system for guidingly moving the pickup unit with a workpiece picked up thereby to a predetermined transfer location; and b) a tool for performing a processing step on a workpiece, said workpiece delivering system further comprising a workpiece mounting system for conveying a workpiece from the transfer location into an operative state on the tool, wherein the workpiece mounting system comprises a seat member for supporting a workpiece and a transfer system for moving a workpiece from the transfer location to a supported position on the seat member, wherein the transfer system comprises a surface that is inclined downwardly from the transfer location toward the seat member to cause a workpiece to be guided under its own weight in movement between the transfer location and the seat member, wherein the transfer system is repositionable between first and second states, with the transfer system in the first state, the surface is inclined downwardly from the transfer location toward the seat member, and with the transfer system in the second state, the surface is inclined downwardly from the seat member towards the pickup unit, said pickup unit comprising at least one carrier with a receptacle for a workpiece that is movable between a return position and a reloading position, said carrier in the return position located to receive in the receptacle a workpiece moving from the seat member guidingly along the surface with the conveyor system in the second state, the carrier in the reloading position situated adjacent to the first storage unit to permit transfer of a workpiece in the receptacle in the carrier to the first storage unit.

13. The workpiece delivering system according to claim 12 including a repositioning element for selectively directing a workpiece from the carrier receptacle with the carrier in the reloading position to the first storage unit.

14. The workpiece delivering system according to claim 12 including a reorienting element for selectively changing the orientation of the seat member from a first position wherein a workpiece is supportable on the seat member and a second position wherein a workpiece on the seat member moves under its own weight away from the seat member.

15. The workpiece delivering system according to claim 14 in combination with a discard receptacle for accepting a workpiece from the seat member as an incident of the seat member moving from the first position into the second position.

16. In combination:
   a) a system for delivering elongate workpieces to a point of use, said workpiece delivering system comprising:
      a first storage unit for a supply of a first type of elongate workpiece;
      a second storage unit for a supply of a second type of elongate workpiece;
      a pickup unit for selectively picking up elongate workpieces one-by-one from the first and second storage units; and
      a guide system for guidingly moving the pickup unit with a workpiece picked up thereby to a predetermined transfer location; and
   b) first and second tools for performing separate processing steps on a workpiece,
      said workpiece delivering system further comprising a workpiece mounting system for conveying a workpiece from the transfer location into an operative state selectively on one of the first and second tools,
      wherein the workpiece mounting system comprises an elongate arm with a seat member for a workpiece thereon, said elongate arm being pivotable between first and second positions, and at least one shifting assembly, the seat member being situated so that a workpiece on the seat member is adjacent to the first tool with the elongate arm in the first position whereupon the shifting assembly can be operated to reposition a workpiece on the seat member into the operative state.

17. A method of manipulating elongate workpieces, said method comprising the steps of:
   providing a first supply of a first type of elongate workpieces at a first location;
   providing a pickup unit on an endless member trained around spaced first and second pulleys;
   moving the pickup unit to a first pickup position;
   transferring a first workpiece from the first supply to a carrying position on the pickup unit;
   guidingly moving the pickup unit and first workpiece from the first pickup position by advancing the endless belt member continuously in one direction around the spaced pulleys to cause the pickup unit with the first workpiece in a carrying position thereon to first travel upwardly and thereafter downwardly a substantial distance to a delivery position; and
   transferring the first workpiece in the carrying position away from the pickup unit at the delivery position to a first point of use.

18. The method of manipulating elongate workpieces according to claim 17 including the step of providing a first tool for performing a processing step on an elongate workpiece and the step of transferring the first workpiece comprises the step of transferring the first workpiece to a mounting system and including the step of placing the first workpiece through the mounting system into an operative state on the first tool.

19. The method of manipulating elongate workpieces according to claim 18 including the steps of providing a second supply of a second type of elongate workpieces at a second location, guidingly moving the pickup unit to a second pickup position, transferring a second workpiece from the second supply to a carrying position on the pickup unit, guidingly moving the pickup unit and second workpiece to a second delivery position, transferring the second workpiece in the carrying position away from the pickup unit at the second delivery position to a second point of use, and providing a second tool for performing a processing step on an elongate workpiece, and the step of transferring the second workpiece comprises the step of transferring the second workpiece to the mounting system, and including the step of placing the second workpiece through the mounting system into an operative state on the second tool.

20. The workpiece delivering system according to claim 17 wherein the first and second pulleys each have a rotational axis, the first rotational axis is above the second rotational axis and extends in a horizontal direction and the step of guidingly moving the pickup unit and first workpiece comprises advancing the belt member downwardly so that the pickup unit with the first workpiece in a carrying position thereon resides below the first axis with the pickup unit and first workpiece in the delivery position.

21. A method of manipulating elongate workpieces, said method comprising the steps of:
   providing a first supply of a first type of elongate workpieces at a first location;
   providing a second supply of a second type of elongate workpieces at a second location;
   providing a pickup unit;
   moving the pickup unit to a first pickup position;
   transferring a first workpiece from the first supply to a carrying position on the pickup unit;

guidingly moving the pickup unit and first workpiece to a delivery position;

transferring the first workpiece in the carrying position away from the pickup unit at the delivery position to a first point of use;

guidingly moving the pickup unit to a second pickup position;

transferring a second workpiece from the second supply to a carrying position on the pickup unit;

guidingly moving the pickup unit and second workpiece to a second delivery position;

transferring the second workpiece in the carrying position away from the pickup unit at the second delivery position to a second point of use;

guidingly moving the pickup unit to a return position;

transferring at least a part of the first workpiece from the first point of use into the carrying position on the pickup unit;

guidingly moving the pickup unit and the at least part of the first workpiece to a reloading position; and transferring the at least part of the first workpiece in the reloading position from the pickup unit to the first supply of elongate workpieces.

22. A method of manipulating elongate workpieces, said method comprising the steps of:

providing a first supply of a first type of elongate workpieces at a first location;

providing a second supply of a second type of elongate workpieces at a second location;

providing a pickup unit;

moving the pickup unit to a first pickup position;

transferring a first workpiece from the first supply to a carrying position on the pickup unit;

guidingly moving the pickup unit and first workpiece to a delivery position;

transferring the first workpiece in the carrying position away from the pickup unit at the delivery position to a first point of use;

guidingly moving the pickup unit to a second pickup position;

transferring a second workpiece from the second supply to a carrying position on the pickup unit;

guidingly moving the pickup unit and second workpiece to a second delivery position;

transferring the second workpiece in the carrying position away from the pickup unit at the second delivery position to a second point of use;

providing a first tool for performing a processing step on an elongate workpiece, wherein the step of transferring the first workpiece comprises the step of transferring the first workpiece to a mounting system;

placing the first workpiece through the mounting system into an operative state on the first tool; and performing a processing step on the first workpiece with the first tool including removing a portion of the first elongate workpiece and with the mounting system transferring the removed portion of the first elongate workpiece to a discard location.

* * * * *